(12) United States Patent
Morikawa et al.

(10) Patent No.: US 10,892,472 B2
(45) Date of Patent: *Jan. 12, 2021

(54) NONAQUEOUS ELECTROLYTE SECONDARY BATTERY

(71) Applicant: Panasonic Intellectual Property Management Co., Ltd., Osaka (JP)

(72) Inventors: Yuki Morikawa, Hyogo (JP); Yasunori Baba, Hyogo (JP); Takashi Ko, Hyogo (JP); Fumiharu Niina, Hyogo (JP); Katsunori Yanagida, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 21 days.

This patent is subject to a terminal disclaimer.

(21) Appl. No.: 16/471,134

(22) PCT Filed: Dec. 11, 2017

(86) PCT No.: PCT/JP2017/044301
§ 371 (c)(1),
(2) Date: Jun. 19, 2019

(87) PCT Pub. No.: WO2018/123526
PCT Pub. Date: Jul. 5, 2018

(65) Prior Publication Data
US 2019/0305291 A1    Oct. 3, 2019

(30) Foreign Application Priority Data

Dec. 28, 2016 (JP) .............................. 2016-256208

(51) Int. Cl.

| | |
|---|---|
| *H01M 4/131* | (2010.01) |
| *H01M 4/133* | (2010.01) |
| *H01M 4/525* | (2010.01) |
| *H01M 4/587* | (2010.01) |
| *H01M 10/0525* | (2010.01) |
| *H01M 4/505* | (2010.01) |
| *H01M 10/0567* | (2010.01) |
| *H01M 4/62* | (2006.01) |
| *H01M 4/485* | (2010.01) |
| *H01M 4/13* | (2010.01) |
| *H01M 10/052* | (2010.01) |
| *H01M 4/36* | (2006.01) |

(52) U.S. Cl.
CPC ............. *H01M 4/131* (2013.01); *H01M 4/13* (2013.01); *H01M 4/133* (2013.01); *H01M 4/36* (2013.01); *H01M 4/485* (2013.01); *H01M 4/505* (2013.01); *H01M 4/525* (2013.01); *H01M 4/587* (2013.01); *H01M 4/62* (2013.01); *H01M 10/052* (2013.01); *H01M 10/0525* (2013.01); *H01M 10/0567* (2013.01); *Y02E 60/10* (2013.01); *Y02T 10/70* (2013.01)

(58) Field of Classification Search
CPC .... H01M 4/131; H01M 10/0567; H01M 4/62; H01M 4/485; H01M 4/13; H01M 10/052; H01M 4/36; H01M 4/133; H01M 4/505; H01M 4/525; H01M 4/587; H01M 10/0525; H01M 10/0568; H01M 4/364; Y02E 60/10; Y02T 10/70
See application file for complete search history.

(56) References Cited

U.S. PATENT DOCUMENTS

| | | | |
|---|---|---|---|
| 6,878,489 B2 * | 4/2005 | Nanjundaswamy | .... H01M 4/34 429/219 |
| 2009/0239146 A1 | 9/2009 | Nakagawa et al. | |
| 2013/0330613 A1 * | 12/2013 | Saruwatari | ............ H01M 4/525 429/211 |
| 2018/0219212 A1 * | 8/2018 | Seol | ...................... H01M 4/505 |

FOREIGN PATENT DOCUMENTS

| | | |
|---|---|---|
| JP | 10-162860 A | 6/1998 |
| JP | 2007-173150 A | 7/2007 |
| JP | 2010-50079 A | 3/2010 |
| WO | 2012/111813 A1 | 8/2012 |

OTHER PUBLICATIONS

International Search Report dated Feb. 20, 2018, issued in counterpart application No. PCT/JP2017/044301 (2 pages).

* cited by examiner

*Primary Examiner* — Muhammad S Siddiquee
(74) *Attorney, Agent, or Firm* — Westerman, Hattori, Daniels & Adrian, LLP

(57) ABSTRACT

A non-aqueous electrolyte secondary battery which uses a lithium titanium composite oxide as a negative electrode active material is configured to use a first positive electrode active material that is a Co-containing lithium transition metal oxide and has a volume per mass of 8 mm$^3$/g or more with respect to pores having a pore diameter of 100 nm or less and a second positive electrode active material that has a volume per mass of 5 mm$^3$/g or less with respect to pores having a pore diameter of 100 nm or less.

5 Claims, 4 Drawing Sheets

# NONAQUEOUS ELECTROLYTE SECONDARY BATTERY

TECHNICAL FIELD

The present disclosure relates to a non-aqueous electrolyte secondary battery.

BACKGROUND ART

On mobile digital assistants such as mobile phones, laptop computers, and smartphones, reduction in size and weight has been rapidly progressing in recent years, and a larger capacity is demanded of their secondary batteries as a power source for driving. A non-aqueous electrolyte secondary battery, which achieves charge and discharge by movement of lithium ions between positive and negative electrodes, has a high energy density and a large capacity, and is thus used widely as a power source for driving mobile digital assistants.

More recently, a non-aqueous electrolyte secondary battery has attracted attention as a power source for engines of electric tools, electric vehicles (EV), hybrid electric vehicles (HEV, PHEV), and the like, and thus wider spread use thereof is expected.

For example, Patent Literature 1 discloses a non-aqueous electrolyte secondary battery having a negative electrode containing lithium titanate as a negative electrode active material and a non-aqueous electrolyte containing $B(C_2O_4)^{2-}$ anions. According to Patent Literature 1, the exothermic reaction in charging is suppressed and high-temperature storage characteristics are improved.

CITATION LIST

Patent Literature

PATENT LITERATURE 1: Japanese Patent Laid-Open Publication No. 2007-173150

SUMMARY

In Patent Literature 1, however, it is difficult to suppress gas generation accompanying charge and discharge cycles. A large amount of gas generated makes the non-aqueous electrolyte secondary battery swell, leading to decreased safety, and the resistance of the non-aqueous electrolyte secondary battery may rise and the capacity thereof may decrease.

An object of the present disclosure is to provide a non-aqueous electrolyte secondary battery capable of suppressing the gas generation accompanying the charge and discharge cycles.

A non-aqueous electrolyte secondary battery of one aspect of the present disclosure comprises a positive electrode having a positive electrode mixture layer containing a first positive electrode active material and a second positive electrode active material, a negative electrode having a negative electrode mixture layer containing a lithium-titanium composite oxide as a negative electrode active material, and a non-aqueous electrolyte containing a lithium salt having an oxalate complex as an anion, wherein the first positive electrode active material is a Co-containing lithium transition metal oxide, and has a pore volume, of pores each having a pore diameter of 100 nm or less, per mass of 8 mm$^3$/g or more; the second positive electrode active material has a pore volume, of pores each having a pore diameter of 100 nm or less, per mass of 5 mm$^3$/g or less; the pore volume, of pores each having a pore diameter of 100 nm or less, per mass of the first positive electrode active material is 4 or more times the pore volume, of pores each having a pore diameter of 100 nm or less, per mass of the second positive electrode active material; the content of the first positive electrode active material is 30 mass % or less based on the total amount of the first positive electrode active material and the second positive electrode active material; and the lithium salt having an oxalate complex as an anion is represented by the general formula: $Li[M(C_2O_4)_xR_y]$, wherein M is B or P, R is a group selected from a halogen, an alkyl group or a halogen-substituted alkyl group, x is a positive integer, and y is 0 or a positive integer.

According to the non-aqueous electrolyte secondary battery of one aspect of the present disclosure, the gas generation in the charge and discharge cycles can be suppressed.

DESCRIPTION OF EMBODIMENTS

<About the Mechanism of Suppressing the Gas Generation in the Present Disclosure>

In a non-aqueous electrolyte secondary battery using a negative electrode active material containing a lithium-titanium composite oxide, in charge and discharge cycles, OH groups and the like present on the surface of the lithium-titanium composite oxide become active points and a non-aqueous electrolyte, moisture and the like are decomposed to cause the gas generation accompanying the decomposition. Here, in the non-aqueous electrolyte secondary battery of the present disclosure, as described below in detail, in the charge process, the Co-containing lithium transition metal oxide (first positive electrode active material) assumes a highly oxidized state and a state of having a high reaction activity. Hence, by repeating charge and discharge, Co becomes liable to be dissolved out from the first positive electrode active material and in the case where no lithium salt having an oxalate complex as an anion is contained in the non-aqueous electrolyte, Co having been dissolved out deposits on the negative electrode surface to remarkably deteriorate the battery performance in some cases. However, it is conceivable that when the non-aqueous electrolyte is made to contain a lithium salt having an oxalate complex as an anion as in the non-aqueous electrolyte secondary battery of the present disclosure, the lithium salt reacts with Co having migrated to the negative electrode and form a chemically stable film on the surface of the lithium-titanium composite oxide. Since it is conceivable that the film covers the active points such as OH groups and the like present on the surface of the lithium-titanium composite oxide, and suppresses the decomposition of the non-aqueous electrolyte and the like, gas generation can be suppressed.

Hereinafter, with reference to the drawings, one example of embodiments of the present disclosure will be described in detail. The non-aqueous electrolyte secondary battery of the present disclosure is not limited to the embodiments described below. The drawings referred for the description of the embodiments are schematically illustrated, and the dimensions and the like of components should be determined in consideration of the description below.

[Non-Aqueous Electrolyte Secondary Battery]

Figure 1:
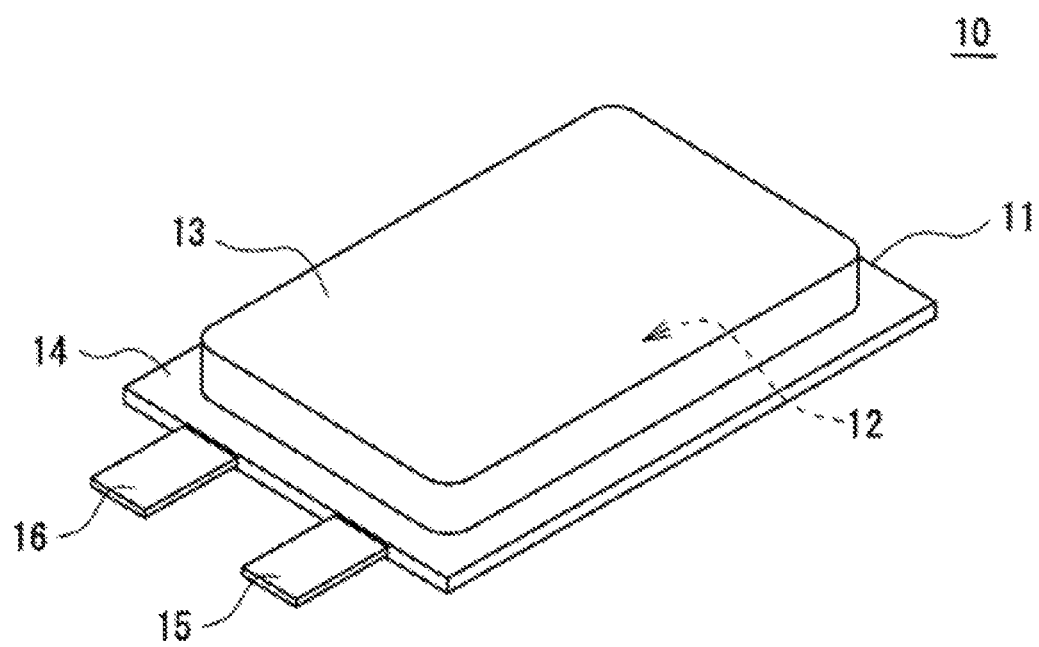
FIG. 1 is a perspective view schematically showing a non-aqueous electrolyte secondary battery as one exemplary embodiment.

Using FIG. 1 and FIG. 2, the configuration of a non-aqueous electrolyte secondary battery 10 will be described. FIG. 1 is a perspective view of the non-aqueous electrolyte secondary battery 10 as one example of the embodiments. As exemplified in FIG. 1, the non-aqueous electrolyte secondary battery 10 includes a battery case 11, and a power generation element housed in the battery case 11. The power generation element includes an electrode assembly 12 having a wound structure and a non-aqueous electrolyte (not shown). A preferred example of the non-aqueous electrolyte secondary battery 10 is a lithium ion battery.

The battery case 11 includes, for example, two laminate sheets. It is preferable to use sheets, each provided with resin layers formed on both sides of a metal layer, and each of the resin layers in contact with each other is preferably composed of a resin capable of being thermo-compression bonded. The metal layer is, for example, a thin film layer of aluminum, and has a function of preventing permeation of moisture or the like. An exterior body housing the power generation element is not limited to one configured by a laminate sheet, and may be a metallic case in a shape, such as a cylindrical shape (cylindrical battery), a rectangular shape (rectangular battery), and a coin shape (coin battery).

The battery case 11 includes a housing part 13 for storing the above-described power generation element, and a sealed part 14 formed around the periphery of the housing part 13. The housing part 13 is formed in such a manner that one of the laminate sheets, facing each other, is subjected to drawing to be formed in a projecting shape projecting to the opposite side to the other laminate sheet. The sealed part 14 is formed by thermally bonding respective end parts of the respective laminate sheets, to seal the internal space of the housing part 13 in which the power generation element is housed.

The non-aqueous electrolyte secondary battery 10 includes a pair of electrode terminals (a positive electrode terminal 15 and a negative electrode terminal 16) led out from the battery case 11. The positive electrode terminal 15 and the negative electrode terminal 16 are led out from an end part of the battery case 11. Each of the positive electrode terminal 15 and the negative electrode terminal 16 is a substantially flat plate-like body, is bonded to each of the laminate sheets at the sealed part 14, and is led out, through the sealed part 14 from between the respective films to the outside of the battery case 11.

Figure 2:
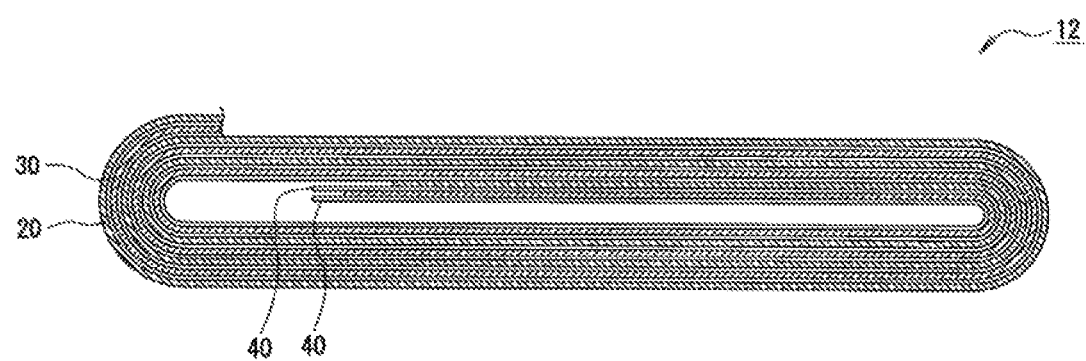
FIG. 2 is a sectional view showing an electrode assembly configuring the non-aqueous electrolyte secondary battery as one exemplary embodiment.

FIG. 2 is a sectional view of an electrode assembly 12 included in the non-aqueous electrolyte secondary battery 10. As shown in FIG. 2, the electrode assembly 12 has a wound structure in which a positive electrode 20 and a negative electrode 30 are wound together with a separator 40 therebetween. The electrode assembly 12 has a flat shape formed by being press-molded from a direction orthogonal to the center axis of the wound structure. The structure of the electrode assembly is not limited to the wound structure, and a plurality of positive electrodes and a plurality of negative electrodes may be alternately laminated with separators interposed therebetween.

Hereinafter, each of the components, particularly the positive electrode 20 and the negative electrode 30, of the non-aqueous electrolyte secondary battery 10 will be described.

[Positive Electrode]

The positive electrode 20 for a non-aqueous electrolyte secondary battery includes, for example, a positive electrode collector such as metal foil and a positive electrode mixture layer formed on the positive electrode collector. Foil of a metal, such as aluminum, that is stable in the electric potential range of the positive electrode 20, a film with such a metal disposed as outer layer, and the like can be used for the positive electrode collector. The positive electrode mixture layer contains a positive electrode active material, a conductive agent and a binder. The positive electrode 20 can be produced by, for example, applying a positive electrode mixture slurry containing the positive electrode active material, conductive agent, the binder and other components to the positive electrode collector, drying the resulting applying film, and rolling the resulting product to form the positive electrode mixture layer on both sides of the collector.

Examples of the conductive agent included in the positive electrode mixture layer include carbon materials such as carbon black, acetylene black, Ketjenblack and graphite. These may be used singly or in combinations of two or more thereof.

Examples of the binder included in the positive electrode mixture layer include fluoro resins such as polytetrafluoroethylene (PTFE) and poly (vinylidene fluoride) (PVdF), polyacrylonitrile (PAN), polyimides, acryl resins and polyolefins, and others. These resins may be combined with carboxymethyl cellulose (CMC) or a salt thereof, poly (ethylene oxide) (PEO), or the like. These may be used singly or in combinations of two or more thereof.

The positive electrode mixture layer contains the first positive electrode active material and the second positive electrode active material, as the positive electrode active material. The first positive electrode active material is a Co-containing lithium transition metal oxide, and has a pore volume, of pores each having a pore diameter of 100 nm or less, per mass of 8 $mm^3/g$ or more. The second positive electrode active material has a pore volume, of pores each having a pore diameter of 100 nm or less, per mass of 5 $mm^3/g$ or less. The ratio of the pore volume, of pores each having a pore diameter of 100 nm or less, per mass of the first positive electrode active material to the pore volume, of pores each having a pore diameter of 100 nm or less, per mass of the second positive electrode active material, is 4 times or more. In addition, the content of the first positive electrode active material is 30 mass % or less, based on the total amount of the first positive electrode active material and the second positive electrode active material.

In the present specification, "a pore volume, of pores each having a pore diameter of 100 nm or less, per mass" of the positive electrode active material is also referred to as a "100 nm or less pores volume", and "the ratio of the pore volume, of pores each having a pore diameter of 100 nm or less, per mass of the first positive electrode active material to the pore volume, of pores each having a pore diameter of 100 nm or less, per mass of the second positive electrode active material" is also referred to as "the first/second pore volume ratio".

The 100 nm or less pores volume of the positive electrode active material can be measured according to a well-known method, and for example, a pore distribution curve is prepared according to the BJH method based on the measurement results of the amount of nitrogen adsorbed on a positive electrode active material, with respect to the nitrogen gas pressure as determined according to the nitrogen adsorption method, and the total volume of pores having a pore diameter within a range of 100 nm or less is determined by summing up the volumes of 100 nm or less pores of the positive electrode active material. The BJH method is a method of in which a pore volume corresponding to a pore diameter is calculated using a pore model having a cylindrical shape to determine a pore distribution. The pore distribution according to the BJH method can be determined using, for example, a device for measuring an amount of a gas absorbed (manufactured by Quantachrome Corporation).

In the positive electrode active material, when the pore volume, of pores each having a pore diameter of 100 nm or less, per mass is large, the effective reaction area increases and the in-solid diffusion distance of Li ions shortens. Since the positive electrode 20 according to the present embodiment contains the first positive electrode active material having a 100 nm or less pores volume of 8 mm$^3$/g or more and the second positive electrode active material having a 100 nm or less pores volume of 5 mm$^3$/g or less, the charge reaction on the positive electrode side is generated preferentially on the first positive electrode active material having a larger effective reaction area and a shorter in-solid diffusion distance. That is, there arises such a state that the charge reaction is inclined to the first positive electrode active material in the positive electrode mixture layer. Further since the content (A) of the first positive electrode active material is 30 mass % or less (0<A≤30 mass %) based on the total amount of the first positive electrode active material and the second positive electrode active material (the content of the first positive electrode active material is lower), in the charge reaction, a load exerted to the first positive electrode active material becomes high. It is conceivable that consequently, since the first positive electrode active material in the charge reaction assumes a more highly oxidized state than the second positive electrode active material to raise the reaction activity, the surface of the first positive electrode active material deteriorates and Co dissolves out. Then, in the case where the positive electrode active material contains only the first positive electrode active material having a 100 nm or less pores volume of 8 mm$^3$/g or more, it becomes easy for the charge reaction to occur uniformly in the entire region of the positive electrode mixture layer, and there becomes difficult the occurrence of the state that the charge reaction is inclined only to a part of the positive electrode active material in the positive electrode mixture layer. Therefore, in the case where the positive electrode active material contains only the first positive electrode active material, the amount of the positive electrode active material assuming a highly oxidized state is very small and there becomes difficult the occurrence of dissolving-out of Co from the first positive electrode active material.

In the first positive electrode active material and the second positive electrode active material, however, the first/second pore volume ratio needs to be 4 times or more. When the first/second pore volume ratio is less than 4 times, it is conceivable that since the 100 nm or less pores volume of the first positive electrode active material is near to the 100 nm or less pores volume of the second positive electrode active material, it is difficult for the charge reaction on the positive electrode side to occur preferentially on the first positive electrode active material, and it becomes difficult for the first positive electrode active material to assume a highly oxidized state.

By thus making the 100 nm or less pores volumes, the contents and the first/second pore volume ratio of the first positive electrode active material and the second positive electrode active material in the ranges specified in the present embodiment, accompanying the charge and discharge cycles, Co dissolves out from the first positive electrode active material. In its turn, the gas generation accompanying the charge and discharge cycles is suppressed conceivably because by reaction of decomposed products originated from the lithium salt having an oxalate complex as an anion in the non-aqueous electrolyte with Co having migrated to the negative electrode, a film is formed on the surface of the lithium-titanium composite oxide.

The content (A) of the first positive electrode active material suffices if being 30 mass % or less (0<A≤30 mass %) based on the total amount of the first positive electrode active material and the second positive electrode active material, but from the viewpoint of reducing the amount of gas generated more accompanying the charge and discharge cycles, and otherwise, the content of the first positive electrode active material is, based on the total amount of the first positive electrode active material and the second positive electrode active material, preferably 3 mass % or more and 30 mass % or less and more preferably 5 mass % or more and 30 mass % or less. The content is especially preferably 5 mass % or more and 20 mass % or less.

The upper limit of the 100 nm or less pores volume of the first positive electrode active material is not especially limited, but is, for example, preferably 100 mm$^3$/g or less and more preferably 50 mm$^3$/g or less.

Further the 100 nm or less pores volume of the first positive electrode active material is preferably 10 mm$^3$/g or more and more preferably 15 mm$^3$/g or more. The lower limit of the 100 nm or less pores volume of the second positive electrode active material is not especially limited, but is 0 mm$^3$/g or more. Further the 100 nm or less pores volume of the second positive electrode active material is more preferably 3 mm$^3$/g or less and still more preferably 2 mm$^3$/g or less.

The first positive electrode active material and the second positive electrode active material are each preferably a lamellar lithium transition metal oxide, which has a lamellar crystal structure. Examples of the first positive electrode active material include lamellar lithium transition metal oxides represented by the general formula (1): $Li_{1+x}Co_aM_bO_{2+c}$, wherein x, a, b and c satisfies the conditions: a+b=1, −0.2≤x≤0.4, 0<a≤1 and −0.1≤c≤0.4, and M is a metal element including at least one element selected from the group consisting of nickel (Ni), manganese (Mn) and aluminum (Al). Examples of the second positive electrode active material include lamellar lithium transition metal oxides represented by the general formula (2): $Li_{1+x}M_aO_{2+b}$, wherein x, a and b meet the conditions: a=1, −0.2≤x≤0.4 and −0.1≤b≤0.4; and M is a metal element including at least one element selected from the group consisting of nickel (Ni), cobalt (Co), manganese (Mn) and aluminum (Al). It is easy for the lamellar lithium transition metal oxide to assume a highly oxidized state when lithium ions are abstracted in the charge reaction. As the lamellar lithium transition metal oxide, lithium nickel cobalt manganese oxide represented by the above general formulae (1) or (2) and including Ni, Co and Mn as M is particularly preferable.

The lamellar lithium transition metal oxide may contain another additive element in addition to Ni, Co, Mn and Al, and examples thereof include an alkali metal element other than Li, a transition metal element other than Mn, Ni and Co, an alkaline earth metal element, a group 12 element, a group 13 element other than Al, and a group 14 element. Specific examples of the other additive element include zirconium (Zr), boron (B), magnesium (Mg), titanium (Ti), iron (Fe), copper (Cu), zinc (Zn), tin (Sn), sodium (Na), potassium (K), barium (Ba), strontium (Sr), calcium (Ca), tungsten (W), molybdenum (Mo), niobium (Nb) and silicon (Si).

The lamellar lithium transition metal oxide suitably contains Zr. This is because it is conceivable that, when containing Zr, the lamellar lithium transition metal oxide has a crystal structure to thereby improve durability of the positive electrode mixture layer at a high temperature and cycle characteristics. The Zr content of the lamellar lithium-containing transition metal oxide is preferably 0.05 mol % or more and 10 mol % or less, more preferably 0.1 mol % or more and 5 mol % or less and particularly preferably 0.2 mol % or more and 3 mol % or less, based on the total amount of metals excluding Li.

The compositions of compounds used as the positive electrode active material and the negative electrode active material can be measured by using an ICP atomic emission spectroscopic analyzer (e.g. "iCAP6300" (product name) manufactured by Thermo Fisher Scientific Inc.).

The synthesizing method for the lamellar lithium transition metal oxide used as the first positive electrode active material and the second positive electrode active material will be described. For example, secondary particles made by aggregation of primary particles of the lamellar lithium transition metal oxide represented by the above general formulae (1) or (2) can be synthesized by mixing oxides obtained by firing a lithium-containing compound such as lithium hydroxide and hydroxides containing metal elements excluding lithium in a target mixing ratio, and firing the resultant mixture. Firing the mixture is carried out in the atmosphere or in an oxygen stream. The firing temperature is, for example, about 500 to 1100° C., and the firing time is, for example, about 1 to 30 hours when the firing temperature is 500 to 1100° C.

The 100 nm or less pores volume of the lamellar lithium transition metal oxide used as the first positive electrode active material and the second positive electrode active material can be adjusted, for example, when the hydroxide containing Co and the above metal element M are prepared. The hydroxide containing Co and the above metal element M can be obtained, for example, by dropping an alkali aqueous solution such as a sodium hydroxide aqueous solution into an aqueous solution containing a compound of Co and the metal element M, and stirring the resultant, and at this time, the temperatures of the aqueous solutions, the time duration for dropping the alkali aqueous solution, the stirring rate, pH and other conditions are adjusted.

For example, the particle diameter of the first positive electrode active material and the second positive electrode active material are each preferably, but not limited to, 2 μm or more and less than 30 μm in terms of the average particle diameter. If the average particle diameter of the first positive electrode active material and the average particle diameter of the second positive electrode active material are each less than 2 μm, the conductive path formed of the conductive agent in the positive electrode mixture layer may be impaired to thereby deteriorate the high-rate cycle characteristics. On the other hand, if the average particle diameter of the first positive electrode active material and the average particle diameter of the second positive electrode active material are each 30 μm or more, the reaction area may decrease to thereby deteriorate the loading characteristics. When the first positive electrode active material and the second positive electrode active material are secondary particles formed by aggregation of the primary particles, the average particle size of the secondary particles of the first positive electrode active material and the second positive electrode active material is preferably within the above range.

The average particle diameter of the positive electrode active material means a volume average particle diameter measured by the laser diffraction method, which means a median diameter at which the cumulative volume is 50% in the particle diameter distribution. The average particle diameter of the positive electrode active material can be measured using, for example, a laser diffraction scattering particle diameter distribution analyzer (manufactured by HORIBA, Ltd.).

Figure 3:
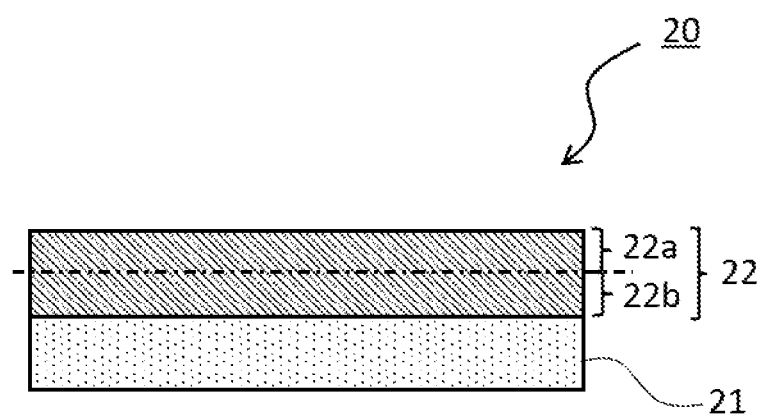
FIG. 3 is a partial schematic sectional view of a positive electrode to be used for a non-aqueous electrolyte secondary battery according to the present embodiment.

FIG. 3 is a partial schematic sectional view of a positive electrode to be used for a non-aqueous electrolyte secondary battery according to the present embodiment. In the positive electrode 20 according to the present embodiment, as illustrated in FIG. 3, when a positive electrode mixture layer 22 formed on a positive electrode collector 21 is divided in the thickness direction into a surface-side region 22a and a collector-side region 22b, the content ratio of the first positive electrode active material contained in the surface-side region 22a of the positive electrode mixture layer 22 based on the total amount of the first positive electrode active material contained in the positive electrode mixture layer 22 is preferably 60 mass % or more and more preferably 65 mass % or more; and the upper limit is preferably 80 mass % or less. It is conceivable that thereby, the durability of the non-aqueous electrolyte secondary battery 10 to the high-rate charge and discharge cycles. Here, the surface-side region 22a of the positive electrode mixture layer 22 means a region from the surface (surface opposite to the surface contacting with the positive electrode collector 21) of the positive electrode mixture layer 22 to the center in the thickness direction, that is, a region on the surface side out of two regions into which the positive electrode mixture layer 22 is equally bisected in the thickness direction, or a region from the surface of the positive electrode mixture layer 22 to half of the thickness of the positive electrode mixture layer 22. Hereinafter, the ratio of the content of the first positive electrode active material contained in the surface-side region of the positive electrode mixture layer based on the total amount of the first positive electrode active material contained in the positive electrode mixture layer is sometimes referred to as the surface-side content ratio of the first positive electrode active material.

The measuring method for the surface-side content ratio of the first positive electrode active material may include, for example, the following method. Of the positive electrode including the positive electrode collector and the positive electrode mixture layer, a surface-side region of the positive electrode mixture layer is cut off by using a cutting tool or the like, on the basis of the thickness of the positive electrode mixture layer measured in advance, and this piece is subjected to centrifugal separation using a centrifugal separator so as to separate the first positive electrode active material; and thereafter, the mass the first positive electrode active material is measured. The positive electrode mixture layer present on the positive electrode collector side, which is left in the positive electrode after the cut-off, is subjected to the same processing as described above so as to measure the mass of the first positive electrode active material. From these measurement results, the surface-side content of the first positive electrode active material is obtained.

As other methods, the followings may be listed. A cross section of the positive electrode mixture layer in the positive electrode 20 is formed by a Cross-section Polisher or the like, and based on a cross sectional image by observing the cross section with a scanning electron microscope (SEM), the number of particles and an average diameter of particles contained in the surface-side region and the whole of the positive electrode mixture layer. From these measurement results, a volume ratio of the first positive electrode active material contained in the surface-side region, based on the first positive electrode active material contained in the whole positive electrode mixture layer is calculated, to thereby obtain the surface-side content of the first positive electrode active material.

In the above-described measuring method for the surface-side content of the first positive electrode active material, when the surface-side region is cut off from the positive electrode mixture layer of the positive electrode, the cutting surface does not necessarily coincide with the center in the thickness direction of the positive electrode mixture layer; and cutting surface may be included within a range of 40% or more and 60% or less in the thickness direction of the positive electrode mixture layer. Furthermore, when there is a large difference between the total amount of a first mixture obtained by cutting off the positive electrode mixture layer present on the surface side and the total amount of a second mixture obtained by cutting off the positive electrode mixture layer present on the positive electrode collector side, the a value of the surface-side content of the first positive electrode active material may be corrected based on the total amount (mass) of each mixture.

The positive electrode 20 according to the present embodiment may be produced, for example, by mixing the first positive electrode active material, the second positive electrode active material, the conductive agent and a binder, and thereafter adding a disperse medium such as an N-methyl-2-pyrrolidone (NMP) so as to prepare a positive electrode mixture slurry, and subsequently applying the positive electrode mixture slurry on the positive electrode collector, and then drying the applying film, and thereafter rolling the resultant to thus form the positive electrode mixture layers on both surfaces of the collector.

The positive electrode 20 according to the present embodiment may be produced, for example, by a method including (1) a slurry preparation step of preparing a first positive electrode slurry that contains the first positive electrode active material, the second positive electrode active material, the conductive agent and the binder, and a second positive electrode slurry that contains the first positive electrode active material, the second positive electrode active material, the conductive agent and the binder, and has a different content between the first positive electrode active material and the second positive electrode active material from that of the first positive electrode slurry; (2) a first applying step of applying the first positive electrode slurry to the surface of the positive electrode collector so as to form a first applying layer; (3) a first drying step of drying the first applying layer formed on the positive electrode collector so as to form a first positive electrode mixture layer, (4) a second applying step of applying the second positive electrode slurry on the surface of the first positive electrode mixture layer so as to form a second applied layer; (5) a second drying step of drying the second applying layer so as to form a second positive electrode mixture layer; and (6) a rolling step of rolling the first positive electrode mixture layer and the second positive electrode mixture layer. At this time, the content of the first positive electrode active material in each of the first positive electrode slurry and the second positive electrode slurry, and the applying amount of the first positive electrode slurry and the second positive electrode slurry (i.e. the thicknesses of the first positive electrode mixture layer and the second positive electrode mixture layer), and others are adjusted such that the content of the first positive electrode active material contained in a region from the surface to the center in the thickness direction of the positive electrode mixture layer (a surface-side positive electrode mixture layer) is set to be 60 mass % or more based on the total amount of the first positive electrode active material contained in the positive electrode mixture layer.

The method of applying the first positive electrode slurry to the surface of the positive electrode collector in the first application step, and the method of applying the second positive electrode slurry to the surface of the first positive electrode mixture layer in the second application step are not particularly limited, and the application may be carried out by using a well-known applying device, such as a gravure coater, a slit coater, or a die coater.

The positive electrode mixture layer may contain another positive electrode active material in addition to the first positive electrode active material and the second positive electrode active material. The percentage by mass of the first positive electrode active material and the second positive electrode active material is preferably, but not limited to, 10 mass % or more and 100 mass % or less, more preferably 20 mass % or more and 100 mass % or less and still more preferably 60 mass % or more and 100 mass % or less, based on the total amount of the positive electrode active material. A positive electrode active material other than the first positive electrode active material and the second positive electrode active material is not particularly limited as long as it is a compound that can reversibly intercalate and deintercalate lithium, and examples thereof include compounds having a crystal structure such as a layered structure, a spinel structure or an olivine structure, that can intercalate and deintercalate lithium ions while retaining its stable crystal structure.

[Negative Electrode]

The negative electrode 30 includes, for example, a negative electrode collector formed of a metal foil, for example, and a negative electrode mixture layer formed on the negative electrode collector. Foil of a metal, such as aluminum, that is stable in the electric potential range of the negative electrode 30, a film with such a metal disposed on an outer layer, or the like can be used for the negative electrode collector. The negative electrode mixture layer contains a negative electrode active material, a conductive agent and a binder. The negative electrode 30 can be produced, for example, by applying a negative electrode mixture slurry containing the negative electrode active material, the binder and other components to the negative electrode collector, drying the resultant applying film, and thereafter rolling the resulting product to form a negative electrode mixture layer on each side of the collector.

The negative electrode 30 according to the present embodiment contains a lithium-titanium composite oxide as the negative electrode active material. The lithium-titanium composite oxide is represented by the general formula (3): $Li_{4+y}Ti_5O_{12}$ (wherein y is 0 or more and 1 or less), and has a spinel type crystal structure.

The lithium-titanium composite oxide can be synthesized, for example, by a method according to the synthesizing method of the lamellar lithium transition metal oxide. For example, a lithium-containing compound such as lithium hydroxide and a titanium containing compound such as titanium dioxide and titanium hydroxide are mixed as a desired mixing ratio, and the mixture is fired, to thereby obtain secondary particles, which are formed of agglomerated primary particles, of the lithium-titanium composite oxide represented by the above general formula (3). Firing the mixture is carried out in the atmosphere or in an oxygen stream. The firing temperature is, for example, about 500 to 1100° C., and the firing time is, for example, about 1 to 30 hours when the firing temperature is 500 to 1100° C.

As a negative electrode active material, the negative electrode 30 may contain, other than a lithium-titanium composite oxide, a compound that can reversibly intercalate and deintercalate lithium ions, like carbon materials such as natural graphite and artificial graphite, a metal that can be alloyed with lithium, such as Si and Sn, or the like.

As the binder used for the negative electrode 30, any well-known binder can be used, and similarly to the case of the positive electrode 20, a fluorocarbon resin such as PTFE, PAN, a polyimide resin, an acrylic resin, a polyolefin resin and the like can be used. Examples of the binder used when the negative electrode mixture slurry is prepared using an aqueous solvent include CMC and its salts, styrene-butadiene rubber (SBR), poly(acrylic acid) (PAA) and its salts, and poly(vinyl alcohol) (PVA).

Examples of the conductive agent contained in the negative electrode mixture layer include carbon materials such as carbon black, acetylene black, Ketjenblack and graphite. These may be used singly or in a combination of two or more.

Figure 4:
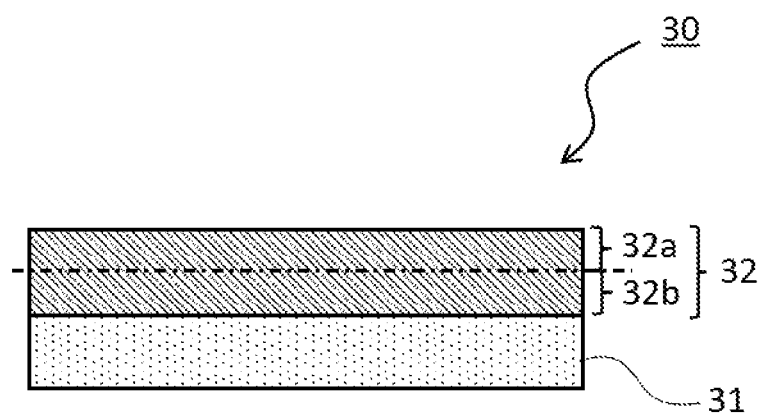
FIG. 4 is a partial schematic sectional view of a negative electrode to be used for a non-aqueous electrolyte secondary battery according to the present embodiment.

FIG. 4 is a partial schematic sectional view of a negative electrode to be used for a non-aqueous electrolyte secondary battery according to the present embodiment. In the negative electrode 30 according to the present embodiment, as illustrated in FIG. 4, when a negative electrode mixture layer 32 formed on a negative electrode collector 31 is divided in the thickness direction into a surface-side region 32a and a collector-side region 32b, the content ratio of the carbon material (a conductive agent and a negative electrode active material) contained in the surface-side region 32a of the negative electrode mixture layer 32 based on the total amount of the carbon material contained in the negative electrode mixture layer 32 is preferably 60 mass % to 80 mass %. Here, the surface-side region 32a of the negative electrode mixture layer 32 means a region from the surface (surface opposite to the surface contacting with the negative electrode collector 31) of the negative electrode mixture layer 32 to the center in the thickness direction thereof, that is, a region on the surface side out of two regions into which the negative electrode mixture layer 32 is equally bisected in the thickness direction, or a region from the surface of the negative electrode mixture layer 32 to half of the thickness of the negative electrode mixture layer 32. Hereinafter, the ratio of the content of the carbon material contained in the surface-side region of the negative electrode mixture layer based on the total amount of the carbon material contained in the negative electrode mixture layer is sometimes referred to as the surface-side content ratio of the carbon material contained in the negative electrode mixture layer.

Examples of measuring methods of the surface-side content ratio of the carbon material contained in the negative electrode mixture layer include the following method. For the negative electrode constituted of the negative electrode collector and the negative electrode mixture layer, the surface-side region of the negative electrode mixture layer is shaven off with a cutting tool or the like based on the thickness of the negative electrode mixture layer previously measured, and centrifuged by using a centrifugal separator to separate the carbon material, whose mass is thereafter measured. The negative electrode mixture layer on the negative electrode collector-side remaining on the negative electrode after the shaving is also subjected to the same treatment as in the above and the mass of the carbon material is measured. The surface-side content ratio of the carbon material can be obtained from these measurement results.

The methods include the following another method. A cross section of the negative electrode mixture layer in the negative electrode 30 is formed by a cross section polisher or the like, and observed by a scanning electron microscope (SEM) to obtain a cross-sectional image, from which the area of the carbon material contained in the surface-side region and the whole of the carbon material is measured. From these measurement results, the area ratio of the carbon material contained in the surface-side region to the carbon material contained in the entire negative electrode mixture layer is calculated to thereby obtain the surface-side content ratio of the carbon material.

In the above measuring method of the surface-side content ratio of the carbon material, when the surface-side region is shaven off the negative electrode mixture layer of the negative electrode, the shaving surface is allowed not necessarily to coincide with the center in the thickness direction of the negative electrode mixture layer, and suffices if being included in the range of 40% or more and 60% or less in the thickness direction of the negative electrode mixture layer. Then, in the case where the difference is large between the total amount of a first-time mixture obtained by shaving off the negative electrode mixture layer on the surface side and the total amount of a second-time mixture obtained by shaving off the negative electrode mixture layer on the negative electrode collector side, the acquisition of the value of the surface-side content ratio of the carbon material suffices if the value is corrected based on the total amounts (mass) of the mixtures.

The negative electrode 30 according to the present embodiment is produced, for example, by mixing the negative electrode active material, the conductive agent and the binder, and thereafter adding a disperse medium such as N-methyl-2-pyrrolidone (NMP) to thereby prepare a negative electrode mixture slurry, and then applying the negative electrode mixture slurry on the negative electrode collector, drying the resultant coated film, and thereafter rolling the resultant to thus form the negative electrode mixture layers on both surfaces of the collector.

The negative electrode 30 according to the present embodiment may be produced, for example, by a method comprising (1) a slurry preparation step of preparing a first negative electrode slurry containing the negative electrode active material, the conductive agent and the binder, and a second negative electrode slurry containing the negative electrode active material, the conductive agent and the binder, and having content ratios of the conductive agent and the binder different from those of the first negative electrode slurry, (2) a first application step of applying the first negative electrode slurry to the surface of the negative electrode collector to thereby form a first applied layer, (3) a first drying step of drying the first applied layer formed on the negative electrode collector to thereby form a first negative electrode mixture layer, (4) a second application step of applying the second negative electrode slurry on the surface of the first negative electrode mixture layer to thereby form a second applied layer; (5) a second drying step of drying the second applied layer to thereby form a second negative electrode mixture layer; and (6) a rolling step of rolling the first negative electrode mixture layer and the second negative electrode mixture layer. At this time, the contents of the carbon material in the first negative electrode slurry and the second negative electrode slurry, and the applied amounts of the first negative electrode slurry and the second negative electrode slurry (that is, the thicknesses of the first negative electrode mixture layer and the second negative electrode mixture layer), and others are regulated so that the content of the carbon material contained in a region (the negative electrode mixture layer on the surface side) constituting the negative electrode mixture layer from the surface thereof to the center in the thickness direction thereof becomes 60 mass % to 80 mass % based on the total amount of the carbon material contained in the negative electrode mixture layer.

A method of applying the first negative electrode slurry to the surface of the negative electrode collector in the first application step, and a method of applying the second negative electrode slurry to the surface of the first negative electrode mixture layer in the second application step are not especially limited, and the application may be carried out by using a well-known applying device, such as a gravure coater, a slit coater, or a die coater.

It is conceivable that by making the surface-side content ratio of the carbon material contained in the negative electrode mixture layer to be 60 mass % to 80 mass %, the electroconductivity of the surface side of the negative electrode mixture layer is improved and it becomes easy for a film to be formed on the surface of the lithium-titanium composite oxide, and as compared with the case not meeting the above range, the gas generation in the charge and discharge cycles is enabled to be suppressed.

The moisture content of the negative electrode active material in the negative electrode mixture layer is, for example, preferably 1,000 ppm or less and more preferably 200 ppm or less. The gas generation accompanying the charge and discharge cycles is caused, besides by decomposition of the non-aqueous electrolyte, also by decomposition of moisture in the battery. Therefore, by making the moisture content of the negative electrode mixture layer in the above range, as compared with the case out of the above range, the gas generation in the charge and discharge cycles is enabled to be suppressed.

[Non-Aqueous Electrolyte]

The non-aqueous electrolyte contains a non-aqueous solvent. Examples of the non-aqueous solvent used for the non-aqueous electrolyte include esters, ethers, nitriles, amides such as dimethylformamide, and mixed solvents of two or more thereof, and further a halogen-substituted product formed by replacing at least one of hydrogen atom of any of the above solvents with a halogen atom such as fluorine may also be used.

Examples of the esters that may be contained in the non-aqueous electrolyte include cyclic carbonate esters, chain carbonate esters and carboxylate esters. Specifically, examples thereof include cyclic carbonate esters such as ethylene carbonate (EC), propylene carbonate (PC), butylene carbonate and vinylene carbonate; chain carbonate esters such as dimethyl carbonate (DMC), methyl ethyl carbonate (MEC), diethyl carbonate (DEC), methyl propyl carbonate, ethyl propyl carbonate and methyl isopropyl carbonate; chain carboxylate esters such as methyl propionate (MP), ethyl propionate, methyl acetate, ethyl acetate and propyl acetate; and cyclic carboxylate esters such as γ-butyrolactone (GBL) and γ-valerolactone (GVL).

Examples of the ethers that may be contained in the non-aqueous electrolyte include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole and crown ethers; and chain ethers such as diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Examples of the nitriles that may be contained in the non-aqueous electrolyte include acetonitrile, propionitrile, butyronitrile, valeronitrile, n-heptanenitrile, succinonitrile, glutaronitrile, adiponitrile, pimelonitrile, 1,2,3-propanetricarbonitrile and 1,3,5-pentanetricarbonitrile.

Examples of the halogen-substituted product that may be contained in the non-aqueous electrolyte include fluorinated cyclic carbonate esters such as 4-fluoroethylene carbonate (FEC), fluorinated chain carbonate esters and fluorinated chain carboxylate esters such as methyl 3,3,3-trifluoropropionate (FMP).

The non-aqueous electrolyte contains a lithium salt having an oxalate complex as an anion. The lithium salt having an oxalate complex as an anion is represented by the general formula (4): $Li[M(C_2O_4)_xR_y]$, wherein M is B or P, R is a group selected from a halogen, an alkyl group or a halogen-substituted alkyl group, x is a positive integer, and y is 0 or a positive integer. Specific examples thereof include lithium bis(oxalato)borate ($Li[B(C_2O_4)_2]$), lithium difluoro(oxalato)borate ($Li[B(C_2O_4)F_2]$), lithium difluorobis(oxalato)phosphate ($Li[P(C_2O_4)_2F_2]$), lithium tris(oxalato)phosphate ($Li[P(C_2O_4)_3]$) and lithium tetrafluoro(oxalato)phosphate ($Li[P(C_2O_4)F_4]$). Among these, lithium bis(oxalato)borate ($Li[B(C_2O_4)_2]$) is preferable in the point of the effect of suppressing the gas generation accompanying the charge and discharge cycles.

The concentration of the lithium salt having an oxalate complex as an anion in the non-aqueous electrolyte is, for example, preferably in the range of 0.01 mol/L to 0.2 mol/L and more preferably in the range of 0.02 mol/L to 0.1 mol/L. It is conceivable that by making the concentration of the lithium salt having an oxalate complex as an anion in the above range, a film having a suitable thickness is formed on the surface of the lithium-titanium composite oxide, and as compared with the case out of the above range, the gas generation in the charge and discharge cycles is enabled to be suppressed more.

The non-aqueous electrolyte, in the point of improving the ionic conductivity, preferably contains conventionally well-known lithium salts other than the lithium salt having an oxalate complex as an anion. The lithium salts specifically include $LiBF_4$, $LiClO_4$, $LiPF_6$, $LiAsF_6$, $LiSbF_6$, $LiAlCl_4$, $LiSCN$, $LiCF_3SO_3$, $LiC(C_2F_5SO_2)$, $LiCF_3CO_2$, $LiPF_{6-x}(C_nF_{2n+1})_x$ (wherein $1 \leq x \leq 6$, and n is 1 or 2), $LiB_{10}Cl_{10}$, $LiCl$, $LiBr$, $LiI$, chloroborane lithium, lithium lower aliphatic carboxylates, and $Li_2B_4O_7$, and imide salts such as $LiN(FSO_2)_2$ and $LiN(C_lF_{2l+1}SO_2)(C_mF_{2m+1}SO_2)$ {wherein l and m are integers of 1 or more}. The lithium salts may be used singly or in combinations of two or more thereof

[Separator]

An ion-permeable and insulating porous sheet is used as the separator 40. Specific examples of the porous sheet include microporous thin film, woven fabric, and nonwoven fabric. Suitable examples of the material for the separator 40 include olefin resins such as polyethylene and polypropylene, and cellulose. The separator 40 may be a laminate including a cellulose fiber layer and a layer of fibers of a thermoplastic resin such as an olefin resin. The separator 40 may be a multi-layered separator including a polyethylene layer and a polypropylene layer, and a separator a surface of which is coated with a resin such as an aramid resin or inorganic fine particles such as alumina, titania may also be used as the separator 40.

EXAMPLES

Hereinafter, the present disclosure will be further described in more details specifically by way of Examples and Comparative Examples, but is not limited to the following Examples.

Example 1

[Production of Positive Electrode]

A lamellar lithium transition metal oxide represented by the composition formula: $Li_{1.054}Ni_{0.199}Co_{0.597}Mn_{0.199}Zr_{0.005}O_2$ (first positive electrode active material A1), and a lamellar lithium transition metal oxide represented by the composition formula: $Li_{1.067}Ni_{0.498}Co_{0.199}Mn_{0.299}Zr_{0.005}O_2$ (second positive electrode active material B1) were mixed in a mixing ratio of 30:70 to thereby obtain a mixture. The 100 nm or less pores volume of the first positive electrode active material A1 was 10 mm$^3$/g, and the 100 nm or less pores volume of the second positive electrode active material B1 was 2 mm$^3$/g, as measured according to the BJH method.

The above mixture, carbon black (conductive agent) and poly(vinylidene fluoride) (PVDF) (binder) were mixed at a mass ratio of 91:7:2. N-methyl-2-pyrrolidone (NMP) as a disperse medium was added to the resultant mixture, and stirred by using a mixer (T.K. HIVIS MIX, manufactured by Primix Corporation) to thereby prepare a positive electrode mixture slurry. Then, the positive electrode mixture slurry was applied on an aluminum foil that is a positive electrode collector, and the applying film was dried so as to form a positive electrode mixture layer.

Thereafter, the positive electrode mixture layer was rolled by a rolling mill so as to produce a positive electrode formed with the positive electrode mixture on both surfaces of the aluminum foil. In the positive electrode, the content of the first positive electrode active material A1 was 30 mass % relative to the total amount of the first positive electrode active material A1 and the second positive electrode active material B1.

[Production of Negative Electrode]

A lithium-titanium composite oxide represented by the composition formula $Li_4Ti_5O_{12}$, a carbon black (conductive agent), and a polyvinylidene fluoride (PVDF) were mixed in a mass ratio of 90:4.8:5.2. NMP was added to the resultant mixture, and the resultant was stirred using a mixer (T.K. HIVIS MIX, manufactured by PRIMIX Corp.) to thereby prepare a negative electrode mixture slurry C1. Then, the negative electrode mixture slurry C1 was applied on an aluminum foil as a negative electrode collector, and the applying film was dried to thereby form a first negative electrode mixture layer.

A negative electrode mixture slurry C2 was prepared by the same method as in the above, except for mixing the lithium-titanium composite oxide represented by the composition formula $Li_4Ti_5O_{12}$, the carbon black (conductive agent), and the polyvinylidene fluoride (PVDF) in a mass ratio of 90:7.2:2.8. Then, the negative electrode mixture slurry C2 was applied on the first negative electrode mixture layer so as to have the same thickness as the first negative electrode mixture layer, and the resultant coated film was dried to thereby form a second negative electrode mixture layer. The first negative electrode mixture layer and the second negative electrode mixture layer were rolled by a rolling mill to thereby produce a negative electrode in which the negative electrode mixture layers were formed on both surfaces of the aluminum foil. The surface-side content ratio of the carbon material in the negative electrode was 60 mass %.

[Preparation of Non-Aqueous Electrolyte]

Propylene carbonate (PC), ethyl methyl carbonate (EMC) and dimethyl carbonate (DMC) were mixed in a volume ratio of 25:35:40. Then, $Li[B(C_2O_4)_2]$ and $LiPF_6$ were dissolved in the resultant mixed solvent so as to have concentrations of 0.05 mol/L and 1.2 mol/L, respectively.

[Production of Battery]

An aluminum lead was attached to each of the above positive electrode and the above negative electrode. A microporous polypropylene membrane was used as a separator, and the positive electrode and the negative electrode were spirally wound through the separator, and a press-molded wound-type electrode assembly was thereby produced. The electrode assembly was housed in a battery case formed by an aluminum laminate sheet; the above non-aqueous electrolyte was injected; thereafter, the opening of the battery case was sealed to thereby produce a laminate-type non-aqueous electrolyte secondary battery having a rated capacity of 220 mAh.

Example 2

A laminate-type non-aqueous electrolyte secondary battery was produced through the same procedure as in Example 1, except for, in the preparation process of the negative electrode mixture slurry C1, mixing the lithium-titanium composite oxide represented by the composition formula $Li_4Ti_5O_{12}$, the carbon black (conductive agent) and the polyvinylidene fluoride (PVDF) in a mass ratio of 90:3.6:6.4, and in the preparation process of the negative electrode mixture slurry C2, mixing the lithium-titanium composite oxide represented by the composition formula $Li_4Ti_5O_{12}$, the carbon black (conductive agent) and the polyvinylidene fluoride (PVDF) in a mass ratio of 90:8.4:1.6. The surface-side content ratio of the carbon material in the negative electrode was 70 mass %.

Example 3

A laminate-type non-aqueous electrolyte secondary battery was produced through the same procedure as in Example 1, except for, in the preparation process of the negative electrode mixture slurry C1, mixing the lithium-titanium composite oxide represented by the composition formula $Li_4Ti_5O_{12}$, the carbon black (conductive agent) and the polyvinylidene fluoride (PVDF) in a mass ratio of 90:7.2:2.8, and in the preparation process of the negative electrode mixture slurry C2, mixing the lithium-titanium composite oxide represented by the composition formula $Li_4Ti_5O_{12}$, the carbon black (conductive agent) and the polyvinylidene fluoride (PVDF) in a mass ratio of 90:4.8:5.2. The surface-side content ratio of the carbon material in the negative electrode was 40 mass %.

Example 4

A laminate-type non-aqueous electrolyte secondary battery was produced through the same procedure as in Example 1, except for, in the production process of the positive electrode, using a lamellar lithium transition metal oxide (first positive electrode active material A2) represented by the composition formula: $Li_{1.054}Ni_{0.199}Co_{0.597}Mn_{0.199}Zr_{0.005}O_2$ in place of the first positive electrode active material A1. The 100 nm or less pores volume of the first positive electrode active material A2 measured by using the BJH method was 8 mm$^3$/g.

Example 5

A laminate-type non-aqueous electrolyte secondary battery was produced through the same procedure as in Example 1, except for, in the preparation process of the non-aqueous electrolyte, using $Li[P(C_2O_4)_2F_2]$ in place of $Li[B(C_2O_4)_2]$.

Comparative Example 1

A laminate-type non-aqueous electrolyte secondary battery was produced through the same procedure as in Example 1, except for, in the production process of the positive electrode, using a lamellar lithium transition metal oxide (first positive electrode active material A2) represented by the composition formula: $Li_{1.054}Ni_{0.199}Co_{0.597}Mn_{0.199}Zr_{0.005}O_2$ in place of the first positive electrode active material A1, and mixing the first positive electrode active material A2 and the second positive electrode active material B1 in a mass ratio of 40:60 to obtain the mixture. The content ratio of the first positive electrode active material A2 was 40 mass % based on the total amount of the first positive electrode active material A2 and the second positive electrode active material B1.

Comparative Example 2

A laminate-type non-aqueous electrolyte secondary battery was produced through the same procedure as in Example 1, except for, in the production process of the positive electrode, using a lamellar lithium transition metal oxide (first positive electrode active material A3) represented by the composition formula: $Li_{1.054}Ni_{0.199}Co_{0.597}Mn_{0.199}Zr_{0.005}O_2$ in place of the first positive electrode active material A1, and using a lamellar lithium transition metal oxide (second positive electrode active material B2) represented by the composition formula: $Li_{1.067}Ni_{0.498}Co_{0.199}Mn_{0.299}Zr_{0.005}O_2$ in place of the second positive electrode active material B1. The 100 nm or less pores volume of the first positive electrode active material A3 was 6 mm$^3$/g, and the 100 nm or less pores volume of the second positive electrode active material B2 was 1.5 mm$^3$/g, as measured by using the BJH method.

Comparative Example 3

A laminate-type non-aqueous electrolyte secondary battery was produced through the same procedure as in Example 1, except for, in the production process of the positive electrode, using a lamellar lithium transition metal oxide (first positive electrode active material A2) represented by the composition formula: $Li_{1.054}Ni_{0.199}Co_{0.597}Mn_{0.199}Zr_{0.005}O_2$ in place of the first positive electrode active material A1, and using a lamellar lithium transition metal oxide (second positive electrode active material B3) represented by the composition formula: $Li_{1.067}Ni_{0.498}Co_{0.199}Mn_{0.299}Zr_{0.005}O_2$ in place of the second positive electrode active material B1. The 100 nm or less pores volume of the second positive electrode active material B3 measured by using the BJH method was 2.7 mm$^3$/g.

Comparative Example 4

A laminate-type non-aqueous electrolyte secondary battery was produced through the same procedure as in Example 1, except for, in the preparation process of the non-aqueous electrolyte, adding no $Li[B(C_2O_4)_2]$.

[Charge and Discharge Cycle Test]

The batteries of the Examples and Comparative Examples produced in the above were each subjected to the following charge and discharge cycle test. The cycle test involved 500-times repetition of a charge and discharge cycle under the temperature condition of 60° C., composed of a constant-current charge at a current value of 1,100 mA up to 2.65 V, a quiescent period of 15 min, a constant-current discharge at a current value of 1,100 mA down to 1.5 V, and a quiescent period of 15 min.

[Evaluation of Amount of Gas Generated]

For the each battery before and after the above charge and discharge cycle test, the difference in battery mass between in the air and in water was measured to calculate the buoyancy (volume) exerted to the battery. The difference in buoyancy between before and after the charge and discharge cycle test was taken as the amount of gas generated. The results are shown in Table 1. Here, the amount of gas generated was expressed as a ratio with the value in Comparative Example 4 being taken to be 100.

TABLE 1

| | First Positive Electrode Active Material | | Second Positive Electrode Active Material | | First/Second Pore Volume Ratio | Content Ratio of First Positive Electrode Active Material (%) |
| --- | --- | --- | --- | --- | --- | --- |
| | Number | 100 nm or less pores volume (mm$^3$/g) | Number | 100 nm or less pores volume (mm$^3$/g) | | |
| Example 1 | A1 | 10 | B1 | 2 | 5 | 30 |
| Example 2 | A1 | 10 | B1 | 2 | 5 | 30 |
| Example 3 | A1 | 10 | B1 | 2 | 5 | 30 |
| Example 4 | A2 | 8 | B1 | 2 | 4 | 30 |
| Example 5 | A1 | 10 | B1 | 2 | 5 | 30 |
| Comparative | A2 | 8 | B1 | 2 | 4 | 40 |

TABLE 1-continued

| | | | | | | |
|---|---|---|---|---|---|---|
| Example 1 | | | | | | |
| Comparative Example 2 | A3 | 6 | B2 | 1.5 | 4 | 30 |
| Comparative Example 3 | A2 | 8 | B3 | 2.7 | 3 | 30 |
| Comparative Example 4 | A1 | 10 | B1 | 2 | 5 | 30 |

| | Oxalato Salt | Oxalato Salt Concentration (mol/L) | Surface-Side Content Ratio of Carbon Material (%) | Amount of Gas Generated (%) |
|---|---|---|---|---|
| Example 1 | $Li[B(C_2O_4)_2]$ | 0.05 | 60 | 68 |
| Example 2 | $Li[B(C_2O_4)_2]$ | 0.05 | 70 | 61 |
| Example 3 | $Li[B(C_2O_4)_2]$ | 0.05 | 40 | 74 |
| Example 4 | $Li[B(C_2O_4)_2]$ | 0.05 | 60 | 76 |
| Example 5 | $Li[P(C_2O_4)_2F_2]$ | 0.05 | 60 | 84 |
| Comparative Example 1 | $Li[B(C_2O_4)_2]$ | 0.05 | 60 | 91 |
| Comparative Example 2 | $Li[B(C_2O_4)_2]$ | 0.05 | 60 | 93 |
| Comparative Example 3 | $Li[B(C_2O_4)_2]$ | 0.05 | 60 | 91 |
| Comparative Example 4 | — | — | — | 100 |

As is clear from the results of Table 1, in the non-aqueous electrolyte secondary batteries using a negative electrode containing the lithium-titanium composite oxide as their negative electrode active material, the batteries of Examples 1 to 5, in which the first positive electrode active material having a 100 nm or less pores volume of 8 mm³/g or more and the second positive electrode active material having a 100 nm or less pores volume of 5 mm³/g or less were contained; the first/second pore volume ratio was 4 times or more; the positive electrode in which the content of the first positive electrode active material is 30 mass % or less based on the total amount of the first positive electrode active material and the second positive electrode active material was used; and the non-aqueous electrolyte containing the lithium salt having an oxalate complex as an anion was used, was able to suppress more the gas generation accompanying the charge and discharge cycles than the batteries of Comparative Examples 1 to 4, which did not meet one of the above constitutions.

Comparing the results of Examples 1 to 5, it can be said that by using $Li[B(C_2O_4)_2]$ and making the surface-side content ratio of the carbon material in the negative electrode active material layer to be 60 mass % or more, the gas generation accompanying the charge and discharge cycles was able to be suppressed more.

REFERENCE SIGNS LIST 10 non-aqueous electrolyte secondary battery
11 battery case
12 electrode assembly
13 housing part
14 sealed part
15 positive electrode terminal
16 negative electrode terminal
20 positive electrode
21 positive electrode collector
22 positive electrode mixture layer
22a surface-side region
22b collector-side region
30 negative electrode
31 negative electrode collector
32 negative electrode mixture layer
32a surface-side region
32b collector-side region
40 separator

The invention claimed is:

1. A non-aqueous electrolyte secondary battery comprising:
    a positive electrode having a positive electrode mixture layer containing a first positive electrode active material and a second positive electrode active material;
    a negative electrode having a negative electrode mixture layer containing a lithium-titanium composite oxide as a negative electrode active material; and
    a non-aqueous electrolyte containing a lithium salt having an oxalate complex as an anion, wherein
    the first positive electrode active material is a Co-containing lithium transition metal oxide and has a pore volume, of pores each having a pore diameter of 100 nm or less, per mass of 8 mm³/g or more,
    the second positive electrode active material has a pore volume, of pores each having a pore diameter of 100 nm or less, per mass of 5 mm³/g or less,
    the pore volume, of pores each having a pore diameter of 100 nm or less, per mass of the first positive electrode active material is 4 or more times the pore volume, of pores each having a pore diameter of 100 nm or less, per mass of the second positive electrode active material,
    the content of the first positive electrode active material is 30 mass % or less based on the total amount of the first positive electrode active material and the second positive electrode active material, and
    the lithium salt having an oxalate complex as an anion is represented by the general formula: $Li[M(C_2O_4)_xR_y]$, wherein M is B or P, R is a group selected from a halogen, an alkyl group or a halogen-substituted alkyl group, x is a positive integer, and y is 0 or a positive integer.

2. The non-aqueous electrolyte secondary battery according to claim 1, wherein
    the negative electrode mixture layer contains a carbon material, and the content of the carbon material in the negative electrode mixture layer from the surface to half of the thickness of the negative electrode mixture layer is 60 mass % to 80 mass % based on the total amount of the carbon material.

3. The non-aqueous electrolyte secondary battery according to claim 1, wherein the first positive electrode active material is a lamellar lithium transition metal oxide represented by the general formula: $Li_{1+x}Co_aM_bO_{2+c}$, wherein x, a, b and c meet the conditions: a+b=1, −0.2x0.4, 0<a≤1 and −0.1≤c≤0.4, and M is a metal element including at least one element selected from the group consisting of Ni, Mn and Al, and the second positive electrode active material is a lamellar lithium transition metal oxide represented by the general formula: $Li_{1+x}M_aO_{2+b}$, wherein x, a and b meet the conditions: a=1, −0.2≤x≤0.4 and −0.1≤b≤0.4, and M is a metal element including at least one element selected from the group consisting of Ni, Co, Mn and Al.

4. The non-aqueous electrolyte secondary battery according to claim 1, wherein the concentration of the lithium salt having an oxalate complex as an anion in the non-aqueous electrolyte is 0.01 mol/L to 0.2 mol/L.

5. The non-aqueous electrolyte secondary battery according to claim 1, wherein the lithium salt having an oxalate complex as an anion is lithium bis(oxalato)borate (Li[B$(C_2O_4)_2$].

* * * * *